Figure 1:
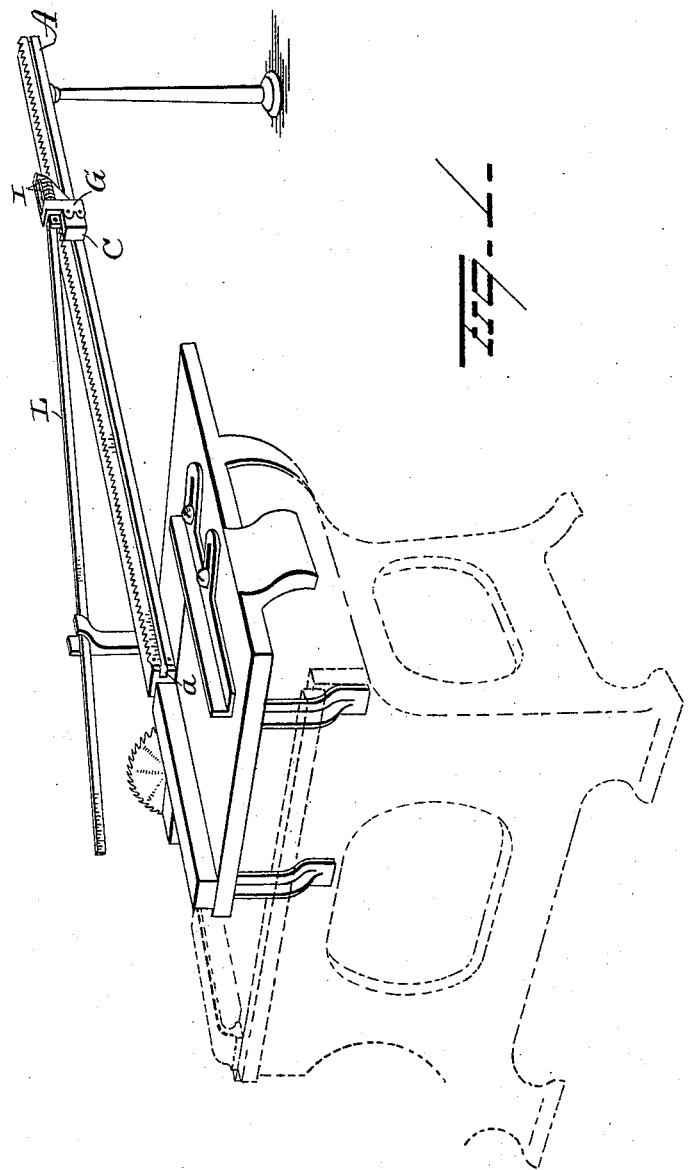

(No Model.) 2 Sheets—Sheet 1.

H. L. WEINEDEL.
GAGE FOR SAW BENCHES.

No. 534,384. Patented Feb. 19, 1895.

Witnesses
E. J. Nottingham
G. F. Downing

Inventor
H. L. Weinedel
By H. A. Seymour
Attorney.

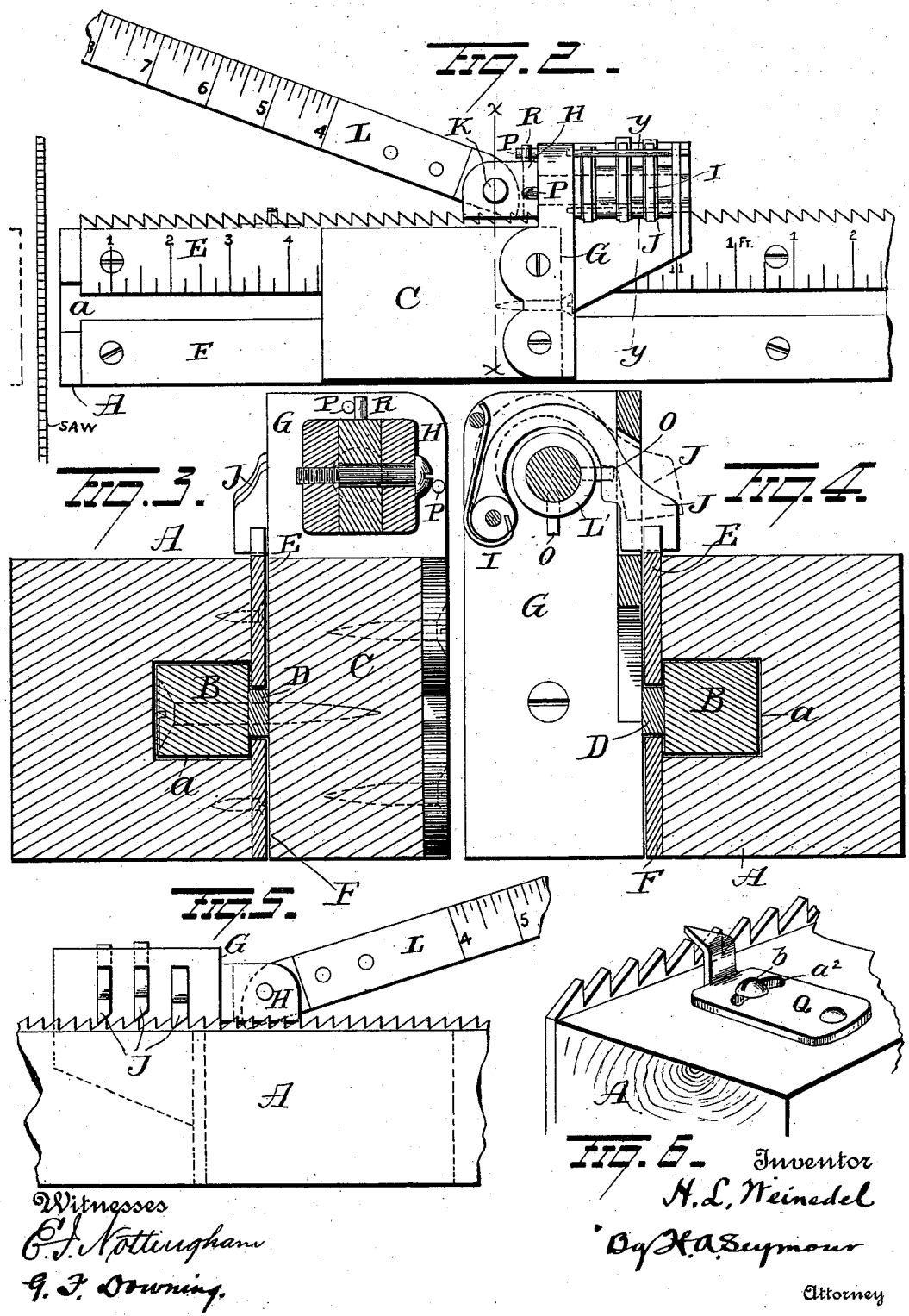

UNITED STATES PATENT OFFICE.

HARRY L. WEINEDEL, OF LOUISVILLE, KENTUCKY, ASSIGNOR OF ONE-HALF TO ALFRED N. STRUCK, OF SAME PLACE.

GAGE FOR SAW-BENCHES.

SPECIFICATION forming part of Letters Patent No. 534,384, dated February 19, 1895.

Application filed June 12, 1894. Serial No. 514,335. (No model.)

*To all whom it may concern:*

Be it known that I, HARRY L. WEINEDEL, of Louisville, in the county of Jefferson and State of Kentucky, have invented certain new and useful Improvements in Gages for Saw-Benches; and I do hereby declare the following to be a full, clear, and exact description of the invention, such as will enable others skilled in the art to which it appertains to make and use the same.

My invention relates to an improvement in gages for saw benches, the object being to provide a device so constructed that the operator can release, adjust and lock the stop block from his working position at the saw, and it consists in the parts and combinations of parts as will be more fully described and pointed out in the claims.

In the accompanying drawings, Figure 1 is a view showing the gage in position on a saw bench. Fig. 2 is a view in elevation of the gage. Fig. 3 is a view in section on the line $x$—$x$ of Fig. 2. Fig. 4 is a view on line $y$—$y$ of Fig. 2. Fig. 5 is a view in side elevation taken from the side opposite that shown in Fig. 2, and Fig. 6 is a view in perspective of a section of the gage showing the pointer thereon.

A, represents a grooved strip of any desired length secured to the top of the saw bench at right angles to the saw, with its grooved face toward the working side of the bench.

Located within the groove $a$ is the sliding block B which latter is held in place by the plates E and F, both of which overlap the groove, the former being provided on its outer face with a graduated scale, and on its upper edge with teeth. This scale is divided into inches and fractions thereof starting from the saw, and shows the distance from the side or face of the saw nearest the stop block C, to said stop block C. This stop block is secured to the sliding block B by screws or otherwise, a spacing piece D being interposed which snugly fits and slides between the adjacent edges of the plates E and F. This stop block forms an abutment against which the end of the lumber is placed, and is adapted to be moved by the devices to be hereinafter described, toward and away from the saw for gaging various lengths.

G, is a casting rigidly secured to the rear end of stop block C and projecting above same as clearly shown in Fig. 3. This casting carries the spindle H provided with the pin R which latter is designed to contact with the pins or stops P on the casting G and limit the rotation of the spindle H to a quarter revolution. Pivoted to the spindle H at the point K is the scale rod L which latter can be of any desired length, and is graduated into inches and fractions thereof, the graduations starting from the end of the stop block C.

Q, is a pointer adjustably secured to the top of the strip A in a position convenient to the operator. This pointer is provided with an elongated slot $a^2$ for the screw $b$ by which it can be adjusted sidewise to compensate for variations or different thicknesses of saws or sets of saws. The graduations on the rod L are such that when the rod L is lowered the pointers Q will indicate on the scale on said rod the exact distance of the face block C from the saw. Hence by the aid of the rod L the block C can be moved to the proper distance from the saw by the operator without changing his position in front of the saw.

J, are a series of dogs or locks, three in the present instance, each of which is normally held in contact with the teeth on the plate E by a spring I. These locks are so located with relation to each other and with the teeth that only one is fully seated in the locked position at a time, the others engaging the teeth at different elevations. By this arrangement it will be seen that three adjustments or stops can be effected in a distance equal to the width of one tooth.

The number of adjustments or stops can be increased or diminished by increasing or lessening the number of locks or dogs.

Secured to the spindle H is a sleeve L' carrying pins O which latter when the spindle is turned as heretofore described engages the locks or dogs and elevates them above the teeth thus permitting the stop C to be moved rearwardly. As the teeth are inclined forwardly the locks or dogs can slide thereon when the rod L is pulled toward the saw. From the foregoing it will be seen that by lowering end of rod L to a level, the exact distance of stop C from the saw is indicated to the operator by the pointer Q. Thus to obtain or set the gage or stop for any desired measure the rod L is first brought to a horizontal position and if the block C is to be moved away from the saw the rod is given a quarter turn to release the locks or dogs J. The block C is then slid back or forward as the case may be, until the pointer Q indicates on the rod L the required distance. After the block has been set and the dogs or locks released so as to engage the teeth the free end of the rod L is elevated and attached to a supporting device which holds it out of the way of the saw.

It is evident that numerous changes in the details might be resorted to without departing from the spirit of my invention. Hence I would have it understood that I do not confine myself to the exact construction shown and described but consider myself at liberty to make such changes and alterations as fairly fall within the spirit and scope of my invention.

Having fully described my invention, what I claim as new, and desire to secure by Letters Patent, is—

1. In a saw gage the combination with a strip having teeth at its upper edge, a sliding stop block connected to said strip, dogs or locks carried by said block and adapted to engage the teeth and a spindle having means for disengaging the locks or dogs from the teeth, of a scale rod hinged to the spindle, and a pointer carried by the strip, substantially as set forth.

2. In a saw gage, the combination with a strip having teeth at its upper edge, a sliding stop block connected to said strip, dogs or locks carried by said block and adapted to engage the teeth and a spindle having means for disengaging the locks or dogs from the teeth, of a scale rod hinged to the spindle and an adjustable pointer carried by the strip, substantially as set forth.

3. In a saw gage, the combination with a strip having teeth at its upper edge, a sliding stop block connected to said strip and dogs or locks adapted to engage the teeth, the said dogs or locks being so arranged relatively to the teeth that only one is seated at a time, of a spindle for releasing the dogs or locks from the teeth, substantially as set forth.

4. In a saw gage, the combination with a strip having teeth, a sliding stop block connected to said strip, spring actuated dogs carried by the block and adapted to engage the teeth, and a spindle carrying means for disengaging the dogs from the teeth, of a scale rod hinged to the spindle and a pointer carried by the strip.

5. In a saw gage, the combination with a strip having teeth, a sliding stop block connected to said strip spring actuated dogs carried by the block and adapted to engage the teeth, and a spindle having means for disengaging the dogs from the teeth, of a scale rod hinged to the spindle and a pointer secured to the strip, substantially as set forth.

In testimony whereof I have signed this specification in the presence of two subscribing witnesses.

HARRY L. WEINEDEL.

Witnesses:
EDWARD MILLER,
CHARLIE WEINEDEL.